United States Patent Office 3,767,622
Patented Oct. 23, 1973

3,767,622
POLY(HYDROXYARYLPOLYMETHYLENESULFO-
NIUM) ZWITTERIONIC MONOMERS AND SUR-
FACE COATINGS THEREFROM
Melvin J. Hatch, Socorro, N. Mex., and Donald L.
Schmidt and Hugh B. Smith, Midland, Mich., assignors
to The Dow Chemical Company, Midland, Mich.
No Drawing. Continuation-in-part of abandoned application Ser. No. 95,923, Dec. 7, 1970, which is a division of application Ser. No. 866,762, Oct. 15, 1969, now Patent No. 3,660,431. This application Apr. 18, 1972, Ser. No. 245,181
Int. Cl. C08g 23/00
U.S. Cl. 260—47 R           15 Claims

ABSTRACT OF THE DISCLOSURE

Poly(hydroxyarylpolymethylenesulfonium) salts (I), prepared by condensation of a polyphenolic resin with a cyclic sulfide, are converted into a sulfonium hydroxide inner salt (II), a reactive zwitterionic monomer. These zwitterionic monomers thermally polymerize to yield water-insoluble, thermoset resins useful as adhesives, coatings, films, and impregnants. Applied to non-porous surfaces, such as glass and wire, hard surface coatings with high impact resistance coupled with good water and chemical resistance are obtained.

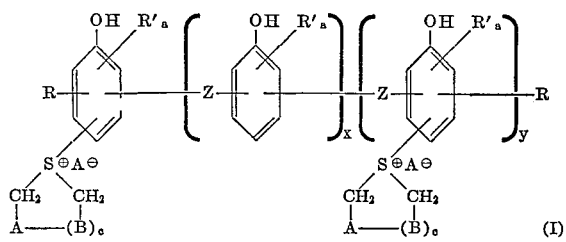
(I)

BACKGROUND

This application is a continuation-in-part of U.S. application Ser. No. 95,923 filed Dec. 7, 1970 and now abandoned which in turn is a division of U.S. application 866,762 filed Oct. 15, 1969 and now U.S. Pat. 3,660,431.

The thermal liability of many sulfonium salts is recognized. Hatch Canadian Pat. 708,230 and British Pat. 960,029 describe film forming compositions containing a sulfonium binder which on heating forms a water insoluble film. Lloyd U.S. Pat. 3,409,660 and Kangas U.S. Pat. 3,322,737 use sulfonium salts as fugitive surfactants and stabilizers in thermally curing latex systems.

In the thermal polymerization of certain sulfonium carboxylate salts disclosed by Hatch, the condensation of the monomeric salt containing an equal number of positive and negative sites yields a polyester and by-product sulfide much as the classical "nylon salt" polymerization yields a polyamide and water. As in the nylon polymerization, by-product sulfide normally requires special processing for complete removal from the product.

STATEMENT OF THE INVENTION

A new class of poly(hydroxyaryl cyclic sulfonium) salts has been discovered which form reactive inner hydroxide salts or switterions. These cyclic sulfonium zwitterions, containing an equal number of positive and negative charge sites, are very reactive monomers. They thermally polymerize without sulfide by-products, the sulfur and attached organic groups becoming part of the polymer structure. With an average of more than one cyclic sulfonium zwitterion per monomer unit (mer), crosslinked polymer resins are obtained.

More specifically, new poly(hydroxyarylpolymethylene sulfonium) salts having Formula I have been prepared and used to synthesize poly(hydroxyarylpolymethylene-sulfonium) zwitterionic monomers having Formula II: i.e.

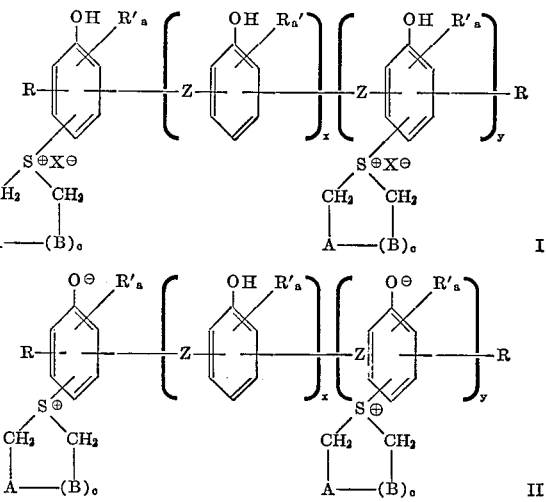

where each R individually is H, Cl, Br, OH, or —OC$_1$—C$_4$ alkyl;
each R' individually is H, Cl, Br, or C$_1$-C$_4$ alkyl and
$a$ is 1 or 2;
each sulfur is ortho or para to a phenolic oxygen;
each A and B individually are —CH$_2$— or —CHR'—
and $c$ is 1 or 2; and
X is a nonbasic inorganic anion;
Z is a bridging group of the formula:
(1) —O—, —S—, —O(C$_m$H$_{2m}$)O— where $m$ is 1–6, and $\Sigma(x+y)=1$;
(2) —CR''$_2$— where R'' is C$_1$-C$_4$ alkyl, and $\Sigma(x+y)=1$;
(3) —CH$_2$— and $\Sigma(x+y)=1$–20; or
(4)

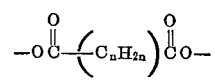

where $n$ is 0–6, and $\Sigma(x+y)=1$.

Preferably X$^-$ is the anion of a strong inorganic acid such as Cl$^-$, Br$^-$, HSO$_4^-$, and HClO$_4^-$.

The zwitterionic monomers (II) thermally polymerize to yield solid polymers containing as an essential element a plurality of oxyarylthioalkylene groups having Formula III:

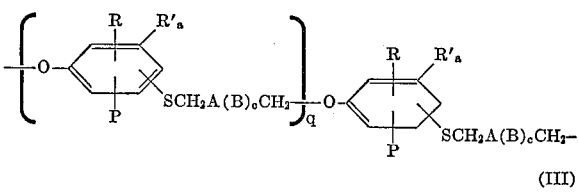

(III)

where P is the remainder of the polyphenolic monomer (II), the other groups are as defined above, and $q$ is at least one.

When the polyphenolic zwitterionic monomer (II) contains an average of more than one polymethylene sulfonium group per molecule, crosslinking occurs through additional oxyarylthiomethylene groups. Hard surface coatings with high impact resistance are obtained by applying the poly(cyclic sulfonium) monomer (II) to a substrate surface and thereafter heating to obtain a water-insoluble crosslinked coating.

GENERAL DESCRIPTION

Poly(hydroxyaryl cyclic sulfonium) salts (I)

These poly(hydroxyaryl cyclic sulfonium) salts are prepared from polyphenols such as bisphenol, diphenyl ether, diphenyl sulfide, bis(o - hydroxyphenyl) $C_1$–$C_4$ alkylene glycol ether, and phenol-formaldehyde resins by processes such as follows:

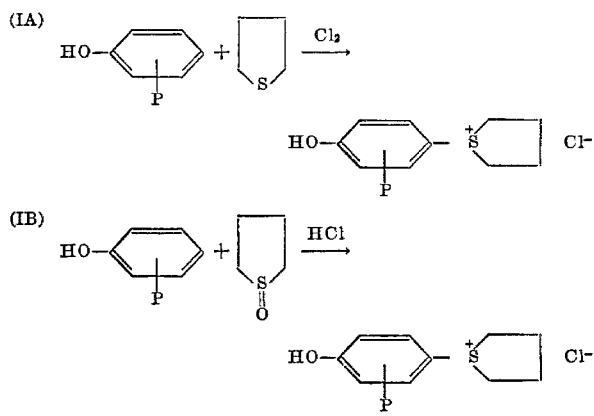

where P is the remaining portion of the polyphenol.

These processes require that the polyphenol reactant have at least one active ortho or para hydrogen per intended sulfonium group. Strong electron-withdrawing substituent groups, such as halogen, carboxylate and nitro, deactivate the polyphenol and cause poor yields. Thus the haloaryl sulfonium salts are preferably prepared by direct halogenation of the sulfonium salt.

Hydroxyaryl sulfonium salts having an average of 1 or less sulfonium groups per molecule normally yield soluble, essentially linear polymers. With an average of more than 1 sulfonium group per molecule, crosslinking and insolubilization occur during the subsequent polymerization.

Process IA is carried out in the dark at a reduced temperature, such as −40° to −10° C., and gives moderate yields of the polyphenolic cyclic sulfonium chloride. At lower temperatures, yields are improved by adding anhydrous HCl to the tetramethylenesulfide prior to adding the polyphenol and $Cl_2$.

In process IB a polyphenol and tetramethylenesulfoxide or pentamethylenesulfoxide condense in the presence of a strong anhydorus acid such as HCl. Methanol can be used as a solvent. Low temperatures and a Lewis acid catalyst such as $AlCl_3$, $SO_2$, etc. are useful in minimizing side reactions and improving color.

By appropriate choice of reactants, process, and process conditions, a wide variety of poly(hydroxyaryl cyclic sulfonium) salts can be prepared.

Typical polyphenol reactants include bisphenols, such as methylenebis(phenol) and isopropylidenebis(phenol), diphenyl ether, diphenyl sulfide, bis ethers and esters of catechol and resorcinol with $C_1$-$C_6$ alkylene glycols and $C_2$-$C_8$ dicarboxylic acids. Useful sulfides and sulfoxides include tetramethylenesulfide, tetramethylenesulfoxide, pentamethylenesulfide, and pentamethylenesulfoxide.

The cyclic sulfonium salts with a nonbasic inorganic anion such as chloride or bromide, are generally stable, solid salts at room temperature, soluble in polar hydroxylic solvents such as water, methanol and isopropanol. Stable hydrates have been isolated of some salts. Illustrative of their chemical stability is the chlorination of the bissulfonium salt of isopropylidenebisphenol with chlorine to yield a chlorinated sulfonium salt.

Purification of the salts can be achieved by crystallization from a mixed solvent such as methylene chloride-methanol, conversion into an insoluble salt e.g., sulfate or perchlorate, or precipitation from aqueous solution with a precipitant diluent such as dioxane, tetrahydrofuran, or higher alcohol.

Poly(hydroxyaryl cyclic sulfonium) zwitterionic monomers (II)

Conversion of the sulfonium salt (I) into the reactive, sulfonium hydroxide inner salt or zwitterionic monomer (II) is achieved by known methods. Ion-exchange with an anion-exchange resin in hydroxide form is particularly suitable. For some salts, direct treatment with a strong inorganic base in a solvent such as anhydrous alcohol in which the by-product inorganic salt has limited solubility is preferred.

Isolation of the crystalline zwitterionic monomer from solution is complicated by polymerization as the solvent is removed. However, stable crystalline hydrates have been isolated in some cases. The structural identity of the zwitterionic monomers has been confirmed by spectrographic analyses.

For many applications the zwitterionic monomer is advantageously used in solution. Thus the monomer can be applied to a surface as an aqueous solution. Evaporation of the solvent yields a partially polymerized film that can be cured by further heating to a hard, resilient coating.

Polymerization

Thermal polymerization of the poly(hydroxyaryl cyclic sulfonium) zwitterionic monomer (II) is a facile reaction involving attack of a phenolic anion on a methylene carbon adjacent to the sulfonium group in the cyclic sulfonium ring with cleavage of the ring and formation of a polymer having a plurality of moieties of Formula III, e.g.,

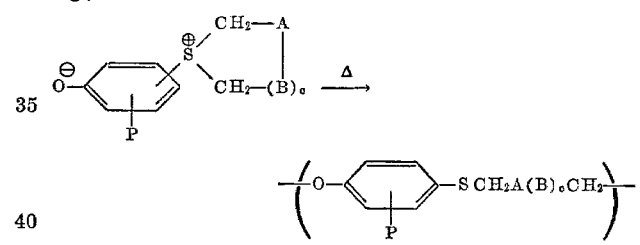

where P is the remaining portion of the polyphenolic monomer. As in other condensation polymerizations, essentially linear polymers are obtained from zwitterionic monomers containing about 1 sulfonium zwitterion per molecule. With an average of more than 1 sulfonium zwitterion per molecule, crosslinking and insolubilization are obtained during polymerization.

Copolymers are prepared from mixtures of sulfonium zwitterionic monomers including the zwitterionic monomers derived from mono(hydroxyaryl cyclic sulfonium) salts described by Hatch, Yoshimine, Smith and Schmidt in U.S. application Ser. No. 866,763 filed Oct. 15, 1969. By appropriate choice of reactants, copolymers can be obtained with varied degrees of crosslinking thus permitting modification of the hardness, flexibility, resilience, and other important physical properties of the polymers.

Although some polymerization may occur at room temperature, differential thermal analysis reveals a major polymerization exotherm for the zwitterionic monomers between about 40°–100° C. Thus rapid polymerization is generally obtained by heating at about 40°–200° C. Particularly in coating applications, it is often desirable to achieve partial polymerization as the solvent is evaporated at 20°–100° C. and then a final cure by heating for a short time at a higher temperature, preferably about 80°–150° C.

Higher molecular weight polymers are normally obtained by polymerizing in the absence of oxygen. In some instances, addition of a nucleophilic amine initiator increases the polymer molecular weight.

The thermal polymers typically have glass transition temperatures between about 30°–110° C. and decomposition temperatures greater than 300° C. as determined by differential thermal analysis. The polymers also have good water and solvent resistance.

Films and coatings

The thermal polymers of the poly(hydroxyaryl cyclic sulfonium) zwitterionic monomers (II) described herein are particularly useful as adhesives, impregnants, coatings and films when the zwitterion monomer can be applied to the substrate or cast from solution and thereafter dried and polymerized in situ. Such coatings can be applied to non-porous surfaces, such as glass and metals, in many forms including sheets, films, wires, filaments, beads etc. to give strong, durable, protective surface coatings by simple and conventional methods. Porous material, including paper and other cellulosic products, textile goods, wood, etc. can also be impregnated or coated with a solution of the sulfonium zwitterionic monomer by standard techniques followed by in situ thermal curing.

Since the sulfonium zwitterionic monomers are very soluble in water and other polar solvents, e.g. 50–70% by wt., relatively thick coatings are easy to obtain. When desired, appropriate pigments and other coating additives can be incorporated in the monomer solution and then fixed in the coating during polymerization. Other advantages arise from the strong adherence of these polymers to the substrate surface and the short curing times required.

The following examples illustrate further the present invention. Unless otherwise stated, all parts and percentages are by weight.

EXAMPLE 1

Bis(hydroxyaryl ether)tetramethylene sulfonium zwitterionic monomers (A) Biscatechol tri- and tetramethylene ethers and bis-resorcinol di-, tri-, and tetramethylene ethers were prepared by the method of Kohn and Wilhelm, Monatsch., 43, 545 (1922). The IR and NMR spectra of these ethers are consistent with the proposed structure.

(B) A solution of 38.5 pts. (0.15 mole) biscatechol trimethylene ether and 34.4 pts. (0.33 mole) tetrahydrothiophene oxide in about 160 pts. methanol was cooled to 0° C. Then anhydrous HCl was passed through the solution at 0°–5° C. for 1.5 hrs. After standing for another hour at about 0° C., the product solution was treated with decolorizing carbon, filtered, and part of the methanol stripped under reduced pressure. The resulting concentrated solution was diluted with ether and the precipitated solid bissulfonium chloride recovered.

*Analysis.*—Calcd. for $C_{23}H_{30}Cl_2O_4S_2$ (percent): C, 54.64; H, 5.98. Found (percent): C, 54.55; H, 6.28.

The IR and NMR spectra of the salt were consistent with the structure of Formula IA.

(C) The zwitterionic monomer was prepared from the bissulfonium chloride by slurrying the methanol solution with an excess of a strong base anion-exchange resin in hydroxide form (Dowex 1–X8 resin, OH⁻ form; 3.5 meq. Cl⁻/g. dry wt.) until the methanol gave a negative test for chloride. The solution was filtered to remove the resin and then assayed. Yield of bissulfonium zwitterionic monomer—59% based on biscatechol ether. Its spectra were consistent with the structure of Formula IIA.

(D) The bissulfonium zwitterionic monomers of the other biscatechol and bisresorcinol polymethylene ethers were prepared in a similar manner in yields of 40–70% based on initial ether. Elemental analyses, IR and NMR spectra were consistent with the general structure of Formulas IA and IIA:

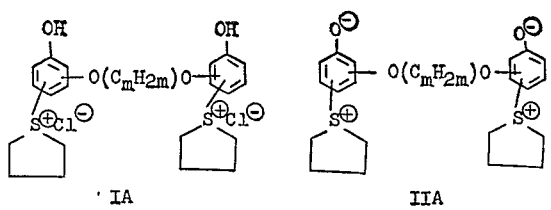

where the tetramethylene sulfonium group is ortho or para to the phenolic oxygen and $m$ is 2–4.

EXAMPLE 2

Bisphenol tetramethylene sulfonium zwitterionic monomers (A) Anhydrous HCl was passed for 90 min. through a solution of 50 pts. (0.22 mole) bisphenol A (4,4'-isopropylidenebisphenol) and 50 pts. (0.48 mole) tetrahydrothiophene oxide in about 570 pts. refluxing liquid $SO_2$ (B.P.—10° C.). Evaporation of the $SO_2$ gave a gummy product which was triturated with ether and a solid sulfonium salt recovered.

The bisphenol tetramethylene sulfonium chloride was dissolved in anhydrous methanol and an equivalent of 1 N NaOCH₃ in methanol added. The resulting mixture was cooled, the precipitated NaCl removed by filtration, and then the filtrate was concentrated under reduced pressure to yield 72 pts. (90% yield on bisphenol A) of a solid tetramethylene sulfonium zwitterionic monomer containing an average of 1.58 sulfonium groups per molecule.

*Analysis.*—Calcd. for $C_{15}H_{13}O_2 \cdot 1.58(C_4H_8S) \cdot 0.5H_2O$ (percent): C, 69.63; H, 7.07; S, 13.77. Found (percent): C, 67.1; H, 7.30; S, 13.77.

Spectral analyses were consistent with the Formulas I and II.

(B) In a similar manner, 1 mole of tetrahydrothiophene oxide was condensed with 1 mole of o,p'-bisphenol A. The monosulfonium chloride salt was recovered as a partial hydrate. Calcd. for $C_{14}H_{23}ClO_2S \cdot 0.3H_2O$ (percent): C, 64.07; H, 6.65; Cl, 9.95; O, 10.33; S, 9.00. Found (percent): C, 64.10; H, 6.62; Cl, 9.90; S, 9.94. Treatment with sodium methoxide gave the monocyclic sulfonium zwitterion monomer.

(C) Condensation of 1 mole tetrahydrothiophene oxide with 1 mole p,p'-bisphenol A gave a different monocyclic sulfonium chloride salt. Calcd. for $C_{14}H_{23}ClO_2S$ (percent): C, 72.57; H, 7.05; S, 10.20. Found (percent): C, 72.50; H, 7.15; S, 10.16.

A detailed NMR analysis of the bisphenol derivatives confirmed structures:

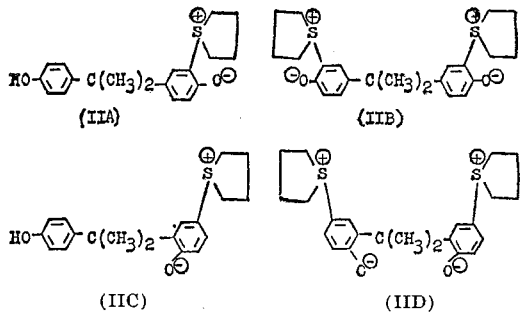

IA is a mixture of about 45% IIA and 55% IIB.

(D) A portion of the bisphenol A sulfonium zwitterionic monomer of Example 1(A) was chlorinated in the dark by adding chlorine to the stirred solution in acetic acid at 20°–35° C. for about 1.25 hours. The recovered chlorinated monomer contained an average of about 1–3 chlorine atoms per molecule depending on the amount of chlorine added. Although the sulfonium group deactivates the hydroxyaryl ring to which it is attached, a portion of the chlorine is substituted on the same ring as determined by spectral analyses.

(E) Similarly other polyphenol tetramethylene sulfonium zwitterionic monomers were obtained from 4,4'-isopropylidene-bis-o-cresol and 2-isopropylidene-(4''-hydroxyphenyl)-4,4'-isopropylidenebisphenol containing an average of more than 1.0 sulfonium groups per molecule.

Analyses of these polyphenol tetramethylene sulfonium salts and zwitterionic monomers were consistent with the structural Formulas I and II, e.g.:

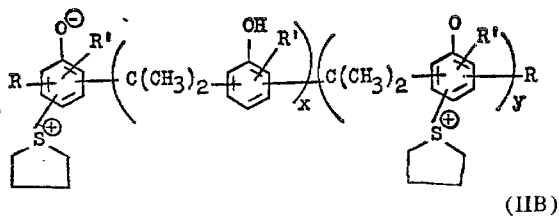

(IIB)

where R and R' individually are H, Cl, or $CH_3$, and $\Sigma(x+y)=1$.

EXAMPLE 3

Phenol-formaldehyde novolak tetramethylene sulfonium zwitterionic monomers (A) To a solution of 10 pts. (0.1 mole) of bis(2-hydroxyphenyl)methane and 10.4 pts. (0.1 mole) tetrahydrothiophene oxide at 0°–10° C. was added 72 pts. (2.0 moles) of dry HCl over 0.5 hr. The mixture was stirred cold for another 0.75 hr. and then slurried with acetone-ether. The solid sulfonium chloride was recovered and air dried, yield 16 pts. (75%).

The methylene bis(4-hydroxy-m-phenylene)bis(tetrahydrothiophenium) chloride was ion-exchanged with a resin in hydroxide form to yield a solid white zwitterionic monomer (IIC). NMR analysis confirmed this structure as a hexahydrate. A sample heated briefly on a hot plate at 150°–200° C. gave a hard, crosslinked polymer.

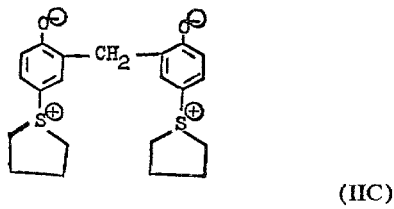

(IIC)

(B) A water-soluble phenol-formaledhyde novolak resin having an average degree of polymerization of 4.5 was condensed with 4.5 moles tetrahydrothiophene oxide in the persence of HCl as described in Example 3(A) and then converted into a sulfonium zwitterionic monomer having an average of more than 1 sulfonium group per molecule (D.P.=4.5). Yield 13%. This monomer partially polymerized at room temperature.

(C) In another run, a water-soluble novolak resin having an average D.P. of 2.5 was condensed with about 0.33 mole of tetrahydrothiophene oxide per phenolic OH. Analysis of the recovered water-soluble monomer in cyclic sulfonium zwitterion form indicated an average degree of substitution of about 1.3. The same novolak resin with a slight excess of tetrahydrothiophene oxide gave a sulfonium monomer containing an average of 1.0 S⊕/phenolic OH.

The IR and NMR spectra of these sulfonium salts and zwitterionic monomers were consistent with structural Formulas I and II, e.g.:

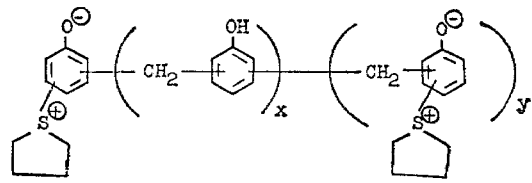

where $\Sigma(x+y)=1-4$. A detailed study of the NMR spectra of the initial novolak resins in $d_5$-pyridine solution and the cyclic sulfonium monomers in $CF_3COOH$ with tetramethylsilane as the internal chemical shift reference established that the water-soluble sulfonium monomers were obtained from novolak resins having less than about 35 mole percent O,O'-methylene bridging.

(D) Other phenol-aldehyde condensation resins as described in Megson, "Phenolic Resin Chemistry," Academic Press, New York, 1958, can be used as the polyphenol reactant. Particularly suitable are the phenol-formaldehyde novolak resins prepared by condensing about 0.7–1.0 mole formaldehyde with 1 mole phenol to give a soluble novolak resin having a degree of polymerization of up to about 20 as described for example in British Pat. 615,335. These sulfonium salts and zwitterionic monomers have structures consistent with Formulas I and II where R, R' and R'' are H and $\Sigma(x+y)$ is 1–20, preferably about 1–4. Halogenated derivatives can be prepared by chlorination or bromination of the cyclic sulfonium salts.

EXAMPLE 4

Bis(hydroxyaryl)ester tetramethylene sulfonium zwitterionic monomers

Using the general procedure of Examples 1(B) and 1(C), 110 pts. (1 mole) resorcinol was condensed with 104 pts. (1 mole) tetrahydrothiophene oxide in the presence of HCl and the resulting sulfonium salt converted into the zwitterionic monomer by treatment with anion-exchange resin in OH⁻ form. The recovered solid monomer was mixed with 0.5 mole succinyl chloride per mole sulfonium monomer and ether. Heating at about 90° C. for 2 hours gave the bis(resorcinol)succinate tetramethylene sulfonium hydrochloride. Treatment with $NaOCH_3$ yielded the corresponding bis sulfonium zwitterionic monomer. Analyses were consistent with the structure IID:

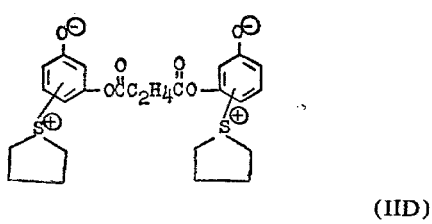

(IID)

where the tetramethylene sulfonium group is ortho or para to the phenolic oxygen. Heating gave a solid crosslinked polymer.

EXAMPLE 5

Polymerization of the poly(hydroxyaryl)tetramethylene sulfonium zwitterionic monomers All of the sulfonium zwitterionic monomers of Examples 1–4 polymerize when heated at about 40°–200° C. Typically the differential thermal analysis (DTA) curve of the biscatechol trimethylene ether sulfonium monomer of Example 1(B) showed a polymerization exotherm between about 60°–100° C. The resulting polymer had DTA endotherms at 50° and 350° C. corresponding to the glass transition temperature, Tg, and the decomposition temperature. In some instances the zwitterionic monomers could not be isolated in crystalline form at room temperature because of polymerization as the solvent is removed.

Applied as an aqueous or alcoholic solution to a surface and then dried and heated, these poly(hydroxyaryl) tetramethylene sulfonium zwitterionic monomers yield water resistant coatings. Cross-linking occurs with an average of more than 1 sulfonium zwitterion group per molecule to yield hard coatings. Blended with a chain extending cyclic sulfonium monomer such as the tetramethylene sulfonium monomer from phenol, o-cresol or 2,6-dichlorophenol, the cross-linking polycyclic sulfonium monomers provide coatings with controlled hardness and flexibility.

EXAMPLE 6

Coatings from bis(hydroxyaryl)ether sulfonium zwitterionic monomers (A) Coatings of the resorcinol and catechol bis alkylene ether sulfonium zwitterionic monomers of Example 1 were applied to 1/32" steel panels by standard techniques using aqueous or methanolic solutions containing 50–70% of the zwitterionic monomer. The solvent was evaporated at 20°–70° C. yielding a clear partially polymerized film that would not redissolve in water or methanol. The films were then cured at 80°–120° C. for 1–2 hours to yield hard coatings. Typical test data on 1.5 mil coatings are given in Table 1.

TABLE 1.—COATED STEEL PANELS (1.5 mil)

| Number | Polyphenol [a] | Hardness [b] | Impact, in.-lbs. | Elongation,[c] percent |
|---|---|---|---|---|
| 1–1 | Biscatechol TME | 20 | 160 | 32 |
| 1–2 | Biscatechol TTME | 17 | 160 | 32 |
| 1–3 | Bisresorcinol DME | 25 | | |
| 1–4 | Bisresorcinol TTME | 30 | 120 | 32 |

[a] DME=dimethylene ether; TME=trimethylene ether; TTME=tetramethylene ether.
[b] Kentron-Knoop hardness. ASTM Method D 1474–62T.
[c] ASTM Method D 522–60 using conical madrel with 32% elongation.

After 1160 hours exposure to the intense light of a Fade-O-Meter, a coating prepared from the biscatechol TME had a reduced impact strength of 25 in.-lbs., but the coating from biscatechol TTME retained an impact strength of 160 in.-lbs. The same coatings showed no change after immersion in water for 20 days at 40° C. and exhibited very little creep along a scratched metal surface after 10 days exposure to a salt spray at room temperature.

(B) Further evidence of the chemical resistance of a 1.0 mil coating of the polymer from biscatechol tetramethylene ether sulfonium monomer applied to steel is shown in Table 2.

TABLE 2.—CHEMICAL RESISTANCE (22° C.)

| Number | Reagent | Days exposure [a] |
|---|---|---|
| 2–1 | 50% KOH | 21 |
| 2–2 | 50% NaOH | 21 |
| 2–3 | 50% HOAc | 21 |
| 2–4 | 100% HOAc | 11 |
| 2–5 | Conc. HNO₃ | 8 |
| 2–6 | Conc. HCL | 21 |
| 2–7 | Conc. H₂SO₄ | 21 |

[a] Days of exposure required for failure.

(C) A copper wire coated with the biscatechol tetramethylene ether (TTME) bissulfonium zwitterionic monomer cured at 100° C. had a dielectric strength of 4000 volts/mil.

EXAMPLE 7

Films from bis(hydroxyaryl)ether sulfonium zwitterionic monomers (A) Films were prepared by casting 40–70% aqueous solutions of the bis(hydroxyaryl)ether sulfonium zwitterionic monomers of Example 1 onto a polished plate treated with a release agent. After drying at 40°–70° C. and then curing at 80°–120° C. for several hours, the resulting polymer films were stripped from the casting plate.

(B) Typical tensile properties of several test films are given in Table 3.

TABLE 3.—TENSILE PROPERTIES (1.5 MIL FILM)

| Number | Polyphenol | Tensile strength, p.s.i. | Tensile modulus, p.s.i. |
|---|---|---|---|
| 3–1 | Biscatechol TME | 5,000 | 2,100 |
| 3–2 | Biscatechol TTME | 7,546 | 1,980 |

(C) Samples of the biscatechol TME and biscatechol TTME sulfonium polymer films were exposed to U.V. radiation for 1000 hrs. (ASTM Method D–1925–60T). Although there was an increase in color, the exposed films showed no apparent cracking or embrittlement.

(D) The solvent resistance of a 1.5 ml. film of the biscatechol TME sulfonium polymer is shown in Table 4.

TABLE 4.—SOLVENT RESISTANCE (4 DAYS. 22° C.)

| Number | Solvent | Weight increase, percent | Volume increase, percent |
|---|---|---|---|
| 4–1 | Naphtha | 0 | 0 |
| 4–2 | Toluene | 11 | 3.7 |
| 4–3 | Acetone | 6.5 | 7 |
| 4–4 | Dimethyl sulfoxide | 40 | 13 |
| 4–5 | CHCl₃ | Failure | Failure |

Furthermore a sample of this polymer film was boiled for 2 days in water with no change in weight or volume.

EXAMPLE 8

Coatings from bisphenol tetramethylene sulfonium zwitterionic monomers (A) Using the general procedure of Example 6, coatings of the bisphenol tetramethylene sulfonium zwitterionic monomers of Example 2 were prepared on steel panels. Because of the crystallinity of the zwitterionic monomer of bisphenol A, coatings form this monomer were grainy. Partial chlorination of the bisphenol A monomer gave a monomer that formed very smooth coatings with increasing hardness with increasing degree of chlorination.

(B) Copolymers were also prepared from mixtures of the bisphenol sulfonium monomers and 4-hydroxyphenyl, 3-methyl-4-hydroxyphenyl, or 3,5 - dichloro - 4 - hydroxyphenyl tetramethylene sulfonium zwitterionic monomers. As the amount of monosulfonium monomer increased, the coatings became more flexible and adherent.

(C) Typical test data for several 1.5 mil bisphenol sulfonium based polymer and copolymer coatings on 1/32" steel panels are given in Table 5.

TABLE 5.—COATED STEEL PANELS

| Number | Polyphenol [a] | Hardness [b] | Impact. in.-lbs. | Elongation,[c] percent |
|---|---|---|---|---|
| 5–1 | CBA | 30–38 | 10–50 | |
| 5–2 | 66% CBA+34% DCP | 20 | 160 | >32 |
| 5–3 | 72% CBA+28% DCP | 23 | 160 | >32 |
| 5–4 | 84% CBA+16% DCP | 24 | 160 | >32 |
| 5–5 | 100% BPA | 27 | 160 | >32 |
| 5–6 | 67% BPA+33% o-Cr | 16.5 | 160 | >32 |

[a] CBA=Chlorinated bisphenol A; DCP=3,5-dichlorophenol; BPA=Bisphenol A; o-Cr=ortho-Cresol.
[b] Kentron-Knoop hardness, ASTM Method D–1474–62T.
[c] ASTM Method D 522–60.

(D) Similar test panel data for several novolak resin based sulfonium zwitterion polymers and copolymers are given in Table 6.

TABLE 6.—COATED STEEL PANELS

| Number | Novolak resin | Hardness [a] | Impact,[b] in.-lbs. |
|---|---|---|---|
| 1 | I–1 (x=0, y=2.5) | 25 | 160 |
| 2 | I–2 (x=0, y=3.5) | 39 | 100 |
| 3 | 50% I–2+50% o-Cresol | 18.7 | 160 |
| 4 | 50% I–1+50% I–2 | 35 | 160 |

[a] Kentron-Knoop hardness, ASTM Method D–1474–62T.
[b] ASTM Method D–522–60.

The chemical and salt spray resistance of these cyclic sulfonium polymers is good and their acid resistance is superior to conventional epoxy resin systems. Further advantages accrue from the ability of these polymer coatings to be applied from aqueous solutions of high solids content and low viscosity and from the short curing times. The coatings have excellent adherence to clean surfaces of metal, wood, paper, plastics including polyethylene, polystyrene, polyurethane, etc., in the form of films, sheets, wire, solid castings, foamed products, etc. Their superior hardness and high impact and scratch resistance are important properties for many applications.

We claim:
1. A solid polymer obtained by thermal polymerization of a poly(hydroxyarylopolymethylenesulfonium) zwitterionic monomer of Formula II:

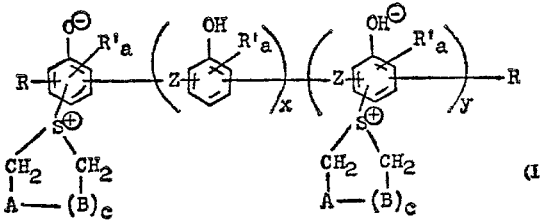

where
each R individually is H, Cl, Br, OH, or —$OC_1$–$C_4$ alkyl;
each R' individually is H, Cl, Br, or $C_1$–$C_4$ alkyl and $a$ is 1 or 2;
each sulfur is ortho or para to a phenolic oxygen;
each A and B individually are —$CH_2$— or —CHR'— and $c$ is 1 or 2;
Z is a bridging group of the formula:
(1) —O—, —S—, —$O(C_mH_{2m})O$— where $m$ is 1–6, and $\Sigma(x+y)=1$;
(2) —$CR''_2$— where R'' is $C_1$–$C_4$ alkyl, and $\Sigma(x+y)=1$;
(3) —$CH_2$— and $\Sigma(x+y)=1$–20; or
(4)

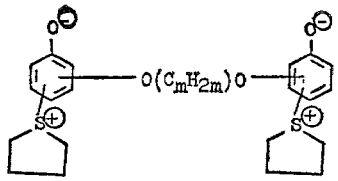

where $n$ is 0–6, and $\Sigma(x+y)=1$.
2. The polymer of claim 1 where —A—$(B)_c$— is —$CH_2CH_2$—.
3. The polymer of claim 1 where Z is
—$O(C_mH_{2m})O$—.
4. The polymer of claim 1 wherein Z is —$CR''_2$—.
5. The polymer of claim 1 consisting in major proportion by weight of polymerized monomer having the formula

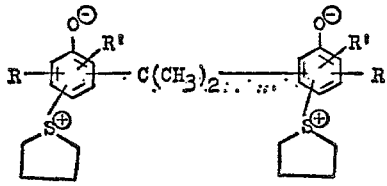

where $m$ is 1–6.
6. The polymer of claim 1 consisting in major proportion by weight of polymerized monomer having the formula

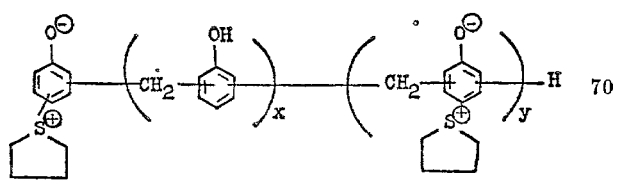

where each R and R' individually are H, Cl, or $CH_3$.
7. The polymer of claim 1 consisting in major proportion by weight of polymerized monomer having the formula:

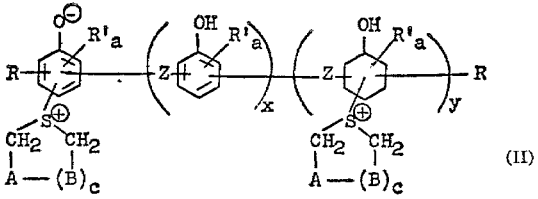

where $x$ and $y$ are numbers with a sum of 1–20.

8. The polymer of claim 1 consisting in major proportion by weight of polymerized monomer having the formula:

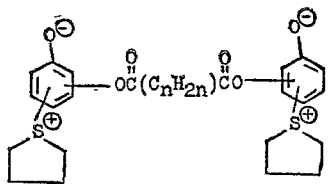

9. The solid polymer of claim 1 obtained by copolymerization of a poly(hydroxyarylpolymethylenesulfonium) zwitterionic monomer of Formula II and a mono-(hydroxyarylpolymethylenesulfonium) zwitterionic monomer of Formula IV:

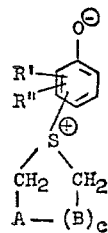

where
each R and R' individually are H, Cl, Br, or $C_1$–$C_4$ alkyl;
R'' is H, Cl, Br, OH, or —$OC_2$–$C_4$ alkyl;
the sulfur is ortho or para to the phenolic oxygen; and
each A and B individually are —$CH_2$— or —CHR'—, and $c$ is 1 or 2.
10. A polymeric film prepared by:
(A) forming a thin coating of a solution containing as an essential element of poly(hydroxyarylpolymethylenesulfonium) zwitterionic monomer having Formula II:

(II)

where
each R individually is H, Cl, Br, OH, or —$OC_2$–$C_4$ alkyl;
each R' individually is H, Cl, Br, or $C_1$–$C_4$ alkyl and $a$ is 1 or 2;
each sulfur is ortho or para to a phenolic oxygen;
each A and B individually are —$CH_2$— or —CHR'— and $c$ is 1 or 2; and
Z is a bridging group of the formula:
(1) —O—, —S—, —$O(C_mH_{2m})O$— where $m$ is 1–6, and $\Sigma(x+y)=1$;
(2) —$CR''_2$— where R'' is $C_1$–$C_4$ alkyl, and $\Sigma(x+y)=1$;
(3) —$CH_2$— and $\Sigma(x+y)=1$–20; or
(4)

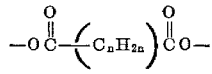

where $n$ is 0–6, and $\Sigma(x+y)=1$–20; and
(B) drying and heating the coating to obtain a water insoluble, cross-linked polymer film.

11. The polymeric film of claim 10 where the monomer is a phenolic ether sulfonium salt having the formula:

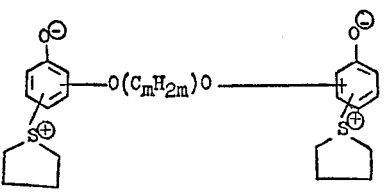

where $m$ is 1–6.

12. The polymeric film of claim 10 where the monomer is a polyphenol sulfonium salt of Formula II where each R and R' individually are H, Cl, or $CH_3$, Z is $-C(CH_3)_2-$, and the sum of $x$ and $y$ is 1–2.

13. The polymeric film of claim 10 where the monomer is a polyphenol sulfonium salt of the formula:

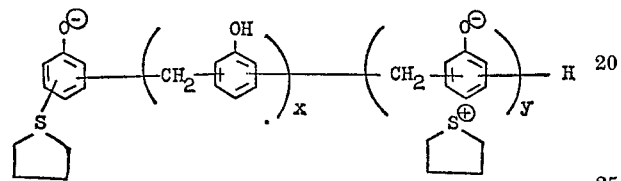

where $x$ and $y$ are numbers with a sum of from 1–20.

14. A solid product having as a surface coating the polymeric film of claim 10.

15. The polymeric film of claim 10 prepared by thermal copolymerization of

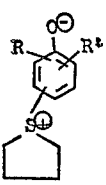 and 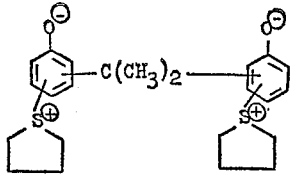

where R and R' individually are H or Cl.

No references cited.

MELVIN GOLDSTEIN, Primary Examiner

U.S. Cl. X.R.

117—128.4, 132 B, 138.8 A, D, E, 148, 155 R; 260—47 C